United States Patent [19]

Abolafia

[11] Patent Number: 5,710,531
[45] Date of Patent: Jan. 20, 1998

[54] STATIC FIELD CONVERTER

[76] Inventor: Andrew Abolafia, 301 E. 63rd St., Apt. 2-J, New York, N.Y. 10021

[21] Appl. No.: 654,699

[22] Filed: May 29, 1996

[51] Int. Cl.$^6$ ............................................. H02K 11/00
[52] U.S. Cl. .............................. 335/216; 310/10; 505/879
[58] Field of Search ................... 335/216; 336/DIG. 1; 310/10; 505/211, 705, 879

[56] References Cited

U.S. PATENT DOCUMENTS

| | | | |
|---|---|---|---|
| 4,237,391 | 12/1980 | Schur et al. | 310/10 |
| 5,334,964 | 8/1994 | Voigt et al. | 505/211 |
| 5,339,061 | 8/1994 | Reick | 335/216 |
| 5,339,062 | 8/1994 | Donaldson et al. | 505/211 |

FOREIGN PATENT DOCUMENTS

| | | | |
|---|---|---|---|
| 3708986 | 12/1987 | Germany | 335/216 |
| 0098795 | 8/1978 | Japan | 335/216 |
| 0024474 | 1/1989 | Japan | 335/216 |
| 1138703 | 5/1989 | Japan | 335/216 |
| 0149409 | 6/1989 | Japan | 335/216 |
| 0273369 | 11/1989 | Japan | 335/216 |
| 4061103 | 2/1992 | Japan | 335/216 |
| 0162402 | 6/1992 | Japan | 335/216 |
| 5268736 | 10/1993 | Japan | 335/216 |
| 1736016 | 5/1992 | Russian Federation | 335/216 |

OTHER PUBLICATIONS

Julius Babiskin "Magnetic Properties of a Hollow Superconductive Lead Sphere" Jan. 1, 1952, Physical Review vol. 85, No. 1, pp. 104–106.

*Primary Examiner*—Michael L. Gellner
*Assistant Examiner*—Raymond M. Barrera
*Attorney, Agent, or Firm*—Bazerman & Drangel, P.C.

[57] ABSTRACT

A device for the conversion of a static magnetic field into electrical energy comprising a permanent or electromagnet for establishing a stationary (static) magnetic field, one or more coils responsive to the magnetic field, a switch to periodically place a load across said responsive coils, and a hemispherical diamagnetic insulating element to periodically shield the coils from the magnetic field to produce electrical energy in the coils. The responsive coil may be cylindrical and totally surround one pole (half) of a magnetic dipole. The insulating element is rotatable around the magnet and is to alternately shield and expose the coil to the field of the magnet. The switch periodically opens and closes the coil circuit corresponding of the rotation of the shield.

13 Claims, 4 Drawing Sheets

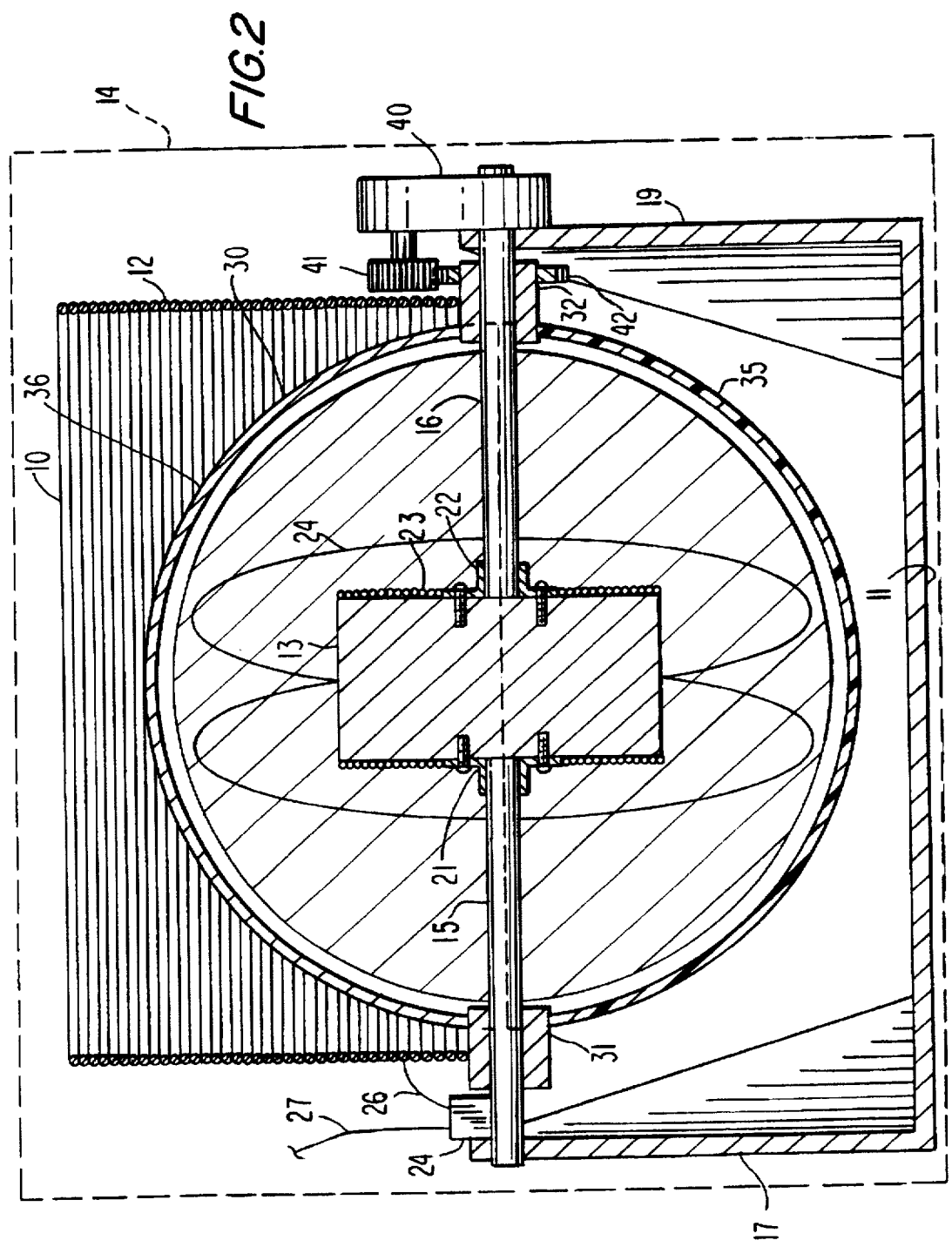

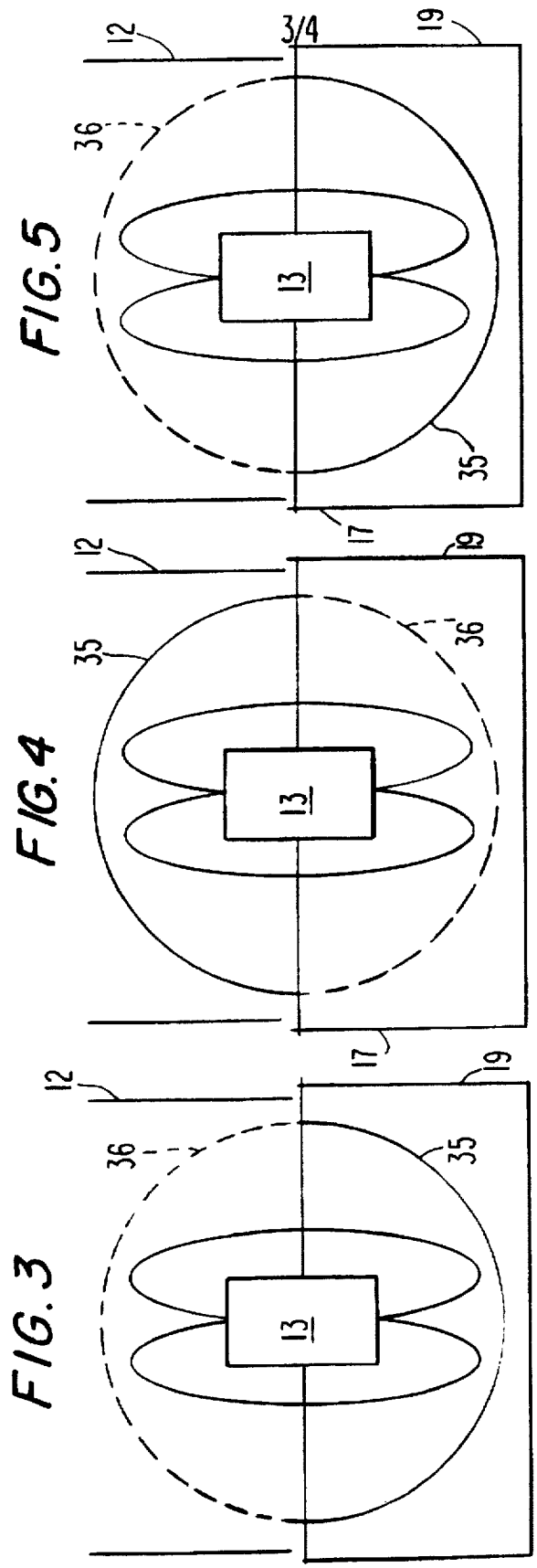

STATIC FIELD CONVERTER

BACKGROUND OF THE INVENTION

1. Field of the Invention

The present invention relates to an apparatus for producing electrical energy and, more particularly, to an electrical device for efficiently transforming the energy of a stationary magnetic field into useful electrical energy for use as an electric generator, a dc/ac converter, dc transformer, or a high energy density battery through the use of the diamagnetic properties of superconductive materials.

2. Description of the Related Art

Various attempts have been made to use the Meissner effect of superconductive materials to perform useful work. The Meissner effect occurs when a superconductive material is cooled to a temperature below its transition point. In a magnetic field, the lines of induction are then pushed out as if the superconductor exhibited perfect diamagnetism. Various devices have been developed which bring a superconductor in or out of the diamagnetic state or mechanically move a superconductive element in relation to a magnetic field and thereby produce or control mechanical, magnetic or electrical energy.

For example, U.S. Pat. No. 5,339,062 to Donaldson et al., issued on Aug. 16, 1994, discloses a system where electical energy is transferred or switched to a secondary inductive element (a coil) through a path which contains a high temperature superconductive element which is capable of holding off the field when in its superconductive state. The superconductive element is driven in and out of the diamagnetic state by heating with a laser pulse. When in its normal state, the flux passes through the element and couples the field to the secondary, which may be connected to a load. When in a superconductive state, there is no coupling. A primary coil of superconductive material around the secondary coil can provide superconducting magnetic energy storage. The primary field is held off by its superconductive elements in the flux path to opposite ends of the secondary coil. These elements may be driven normal by laser pulses to transfer the stored magnetic energy to a load. A plurality of secondary coils, each with associated superconductive elements, may be selectively coupled to the load as programmed inductive elements. Similarly, Soviet Union Patent No. 1736016-A1 dated May 23, 1992 to Kuroedov Yu D, discloses a device for storing electromagnetic energy and generating pulsed currents using a superconductive screen located between the windings.

Japanese Patent No. 1-24474 (A) dated Jan. 26, 1989 to Sharp Corp., discloses a disk 11 which is driven into rotation by the repulsion between a permanent magnet 15 and a layer of cooled superconductive material 13 at the edge of disk 11 thereby providing rotational force. Similarly, Japanese Patent No. 1-273369 (A) dated Nov. 1, 1989 to Fuji Electric Co., Ltd., also uses the Meissner effect to drive a rotating disk. Japanese Patent No. 5-268736 (A) dated Oct. 15, 1993 to Sanyo Electric Co. Ltd., discloses a motor driven by a dc source without energy loss. A disk is floated in position by means of the diamagnetic properties of superconductors. Thus, the function of the superconductive element is to suspend the rotor and eliminate friction.

Japanese Patent No. 1-149409 (A) dated Jun. 12, 1989 to Mitsubishi Electric Corp., shows a static superconducting generator where mechanical movement of a superconductive element in a magnetic field acts to generate power. Japanese Patent No. 1-138703 (A) dated May 31, 1989 to Toshio Takayama, discloses an electric generator using superconductive elements as a magnetic shield. German Patent No. DE 708986 dated Mar. 19, 1987 to Priebe, K. P., shows a field effected induction unit to convert magnetic to electric energy uses, by use of a superconducting material to form a screen of the induction coil.

U.S. Pat. No. 4,237,391 to Shur and Abolafia, discloses an electrical generator comprising a stationary permanent magnet for establishing a magnetic field, one or more sensing coils responsive to the magnetic field and a diamagnetic blocking element movable between the magnet and sensing coil for periodically interrupting the magnetic field to produce electrical energy in the coil. In that device, the blocking element is a rotatable disk interposed between a magnet and a coil. The rotatable disk has a semicircular portion of superconductive material and a semicircular portion of magnetically inert material to alternately block and pass the magnetic field to the coils upon rotation of the disk. It does not disclose the use of a hemispherical shielding member which rotates around the magnetic or electromagnetic element.

Most of these patents require bringing an element in and out of a superconductive state and as such, requires the expenditure of substantial energy in making this transition. This prior art does not disclose a system in which a superconductive shielding element rotates around a magnetic field to alternately expose and shield a responsive electrical coil from the magnet.

SUMMARY OF THE INVENTION

In the present invention, a superconductive magnetic insulating/blocking device in the form of a hemisphere, rotates inside a responsive means such as a coil to periodically shield and unshield the responsive means from a magnetic field. The invention provides for the efficient transformation of the energy of the magnetic field into electrical energy and can thus be used as a dc transformer, a dc to ac converter, an electric generator or a very high energy density battery.

Faraday's Law states that the induced emf around a closed mathematical path in a magnetic field is equal to the rate of change of magnetic flux intercepted by the area within the path, or $$\epsilon = \theta/dt$$

where $\epsilon$ = electromotive force $\theta$ = BA

B = Magnetic field

A = Area bounded by conductor

Faraday's Law is unconcerned with how the change in the magnetic flux occurs. Inefficient systems can use large amounts of energy to change the magnetic flux and produce the electromotive force while more efficient methods for changing the flux may be used to produce the same electromotive force for far less energy. Thus, the efficiency in the production of the emf is a product of the efficiency in changing the magnetic flux which passes through the closed circuit.

In the present invention, the Meissner effect of superconductive materials (i.e., the diamagnetic properties of a superconductive material operating at a temperature below its transition temperature) are exploited to provide a device for producing electrical energy from a fixed magnetic field. A superconductive element maintained at a temperature immediately below its transition temperature or colder periodically acts to shield a responsive means such as a coil from a magnetic field established by a permanent or electromagnet, to generate electrical energy.

A static field converter of the present invention comprises a magnetic dipole such as a permanent or electromagnet for establishing a magnetic field, a responsive means which generates electric current in response to the magnetic field established by the magnetic dipole, a shielding means interposed between the field of the magnetic dipole and a responsive means, a switching device to periodically open and close the circuit forming the responsive means, and a driving means to rotate the shielding means.

The magnetic dipole can be any source of magnetic field such as a permanent or electromagnet. The shielding means comprises a magnetic flux shielding device of diamagnetic material mounted for movement between the magnetic dipole and the responsive means, thereby alternately shielding and unshielding the magnetic flux from the magnetic dipole to the responsive means. The shielding means of the preferred embodiment comprises a hemisphere of superconductive material mounted such that it rotates around the field of the magnetic dipole and the magnetic dipole, thereby alternately shielding and unshielding the responsive means from the magnetic field. The shield may form part of a rotatable sphere composed of two hemispherical elements, the first of magnetically inert material and the second of superconductive material. This sphere may be mounted about a sphere of ferro-magnetic material such as transformer steel or the like which would enclose and confine the field of the magnet dipole.

The sensing means may comprise an electrical coil positioned around the shielding means and thus around the magnetic dipole. The coil forming the responsive means may be periodically opened and closed during the operating cycle of the present invention thereby eliminating magnetic resistance to rotation of the shielding means as it rotates around the magnetic dipole and in and out of the responsive means. An electric motor or other means can be used to rotate the shield.

BRIEF DESCRIPTION OF THE DRAWINGS

The foregoing and other objects, features and advantages of the present invention will become more apparent by the reading of the following description in connection with the accompanying drawings, in which:

FIG. 2 is a cross-sectional view of the apparatus of FIG. 1, taken at 2—2, with lines added to show magnetic flux and other schematic elements;

FIG. 3 is a schematic diagram showing a first position of the shield member in an operation cycle with a representation of the corresponding flux pattern shown;

FIG. 4 is a schematic diagram showing a second position for the shielding member in an operation cycle as it rotates 180° from the first position with the corresponding flux pattern shown; and FIG. 5 is a schematic diagram showing the return position of the shield member to the first position in its operation cycle with the corresponding flux pattern shown.

Referring to FIGS. 1 and 2, the superconductive static field converter unit 10 of the present invention is shown. It is adapted to be immersed in a low temperature vessel, e.g. a Dewer tank or refrigeration unit 14 diagrammatically shown in FIG. 2 to maintain the unit at temperatures below the transition temperature of the superconductive material. The static field converter 10 includes a circular base 11 provided with four support means 17, 18, 19 and 20 extending upward from the circular base.

Figure 1:
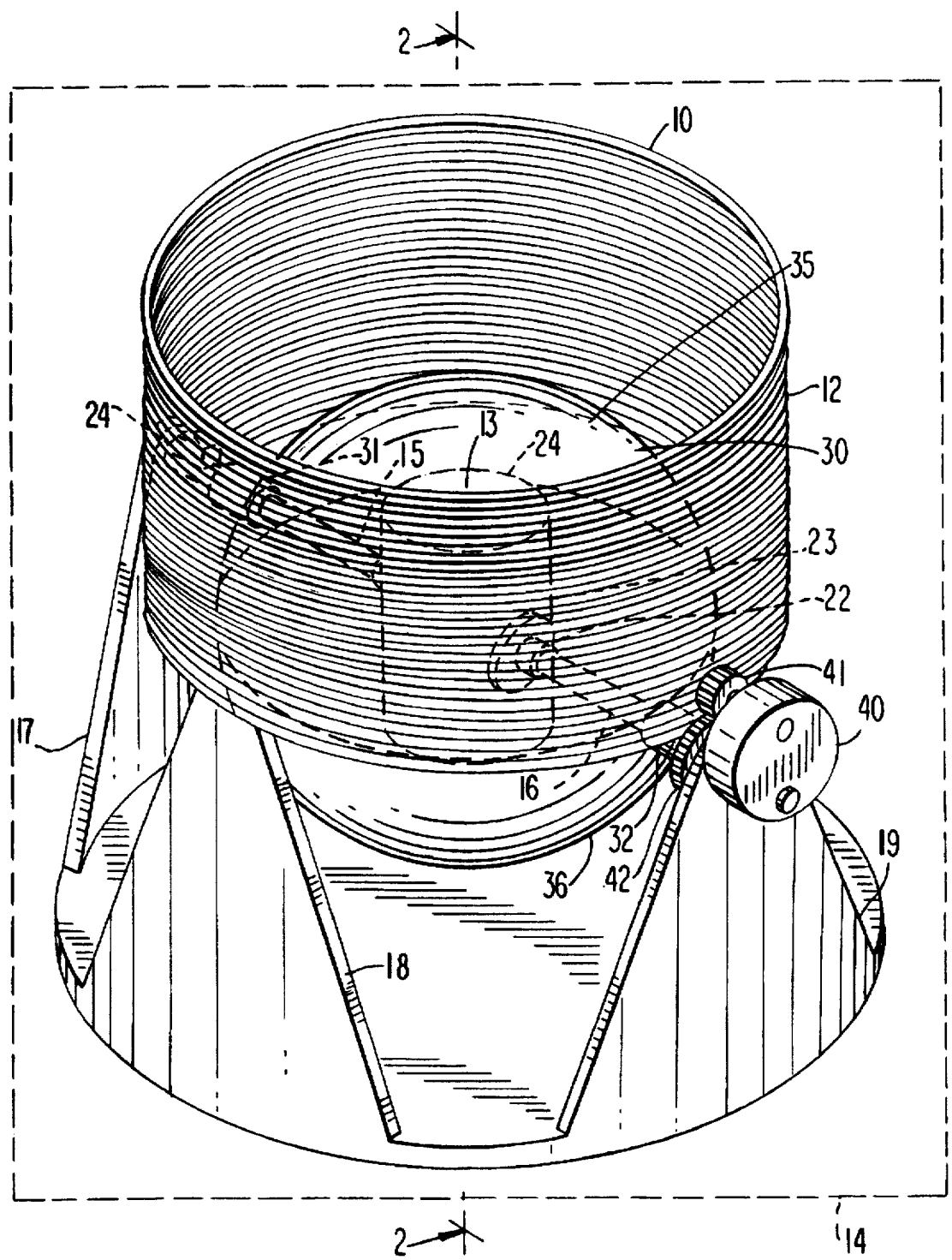
FIG. 1 is a perspective view, with interior elements shown by dotted lines, of a static field converter constructed in accordance with the principles of the present invention.
Figure 6:
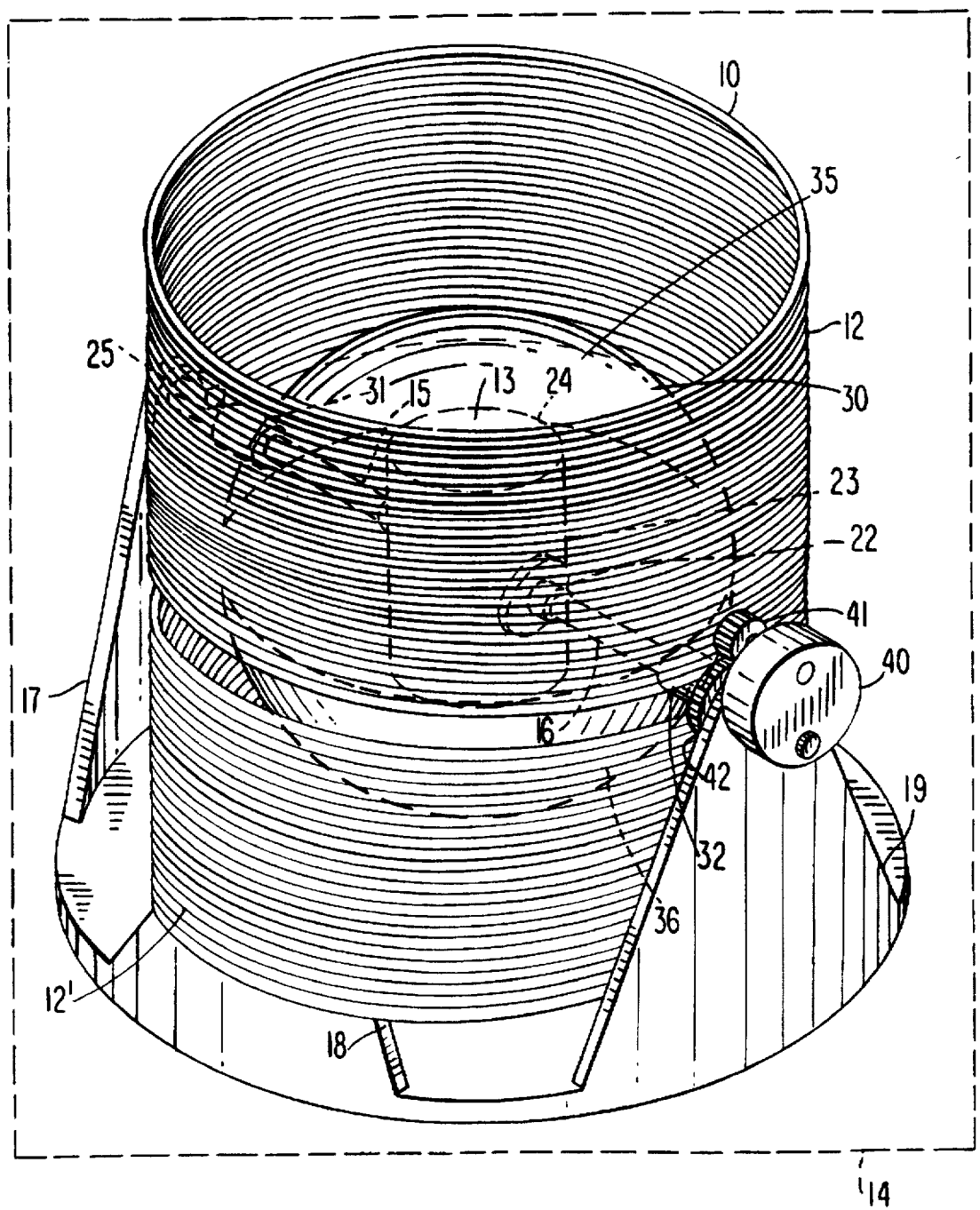
FIG. 6 is a perspective view with interior elements shown by dotted lines of a second embodiment of the static field converter constructed in accordance with the principles of the present invention in which there are two sets of coils.

A magnet 13 is mounted on support means 17 and 19 by rods 15 and 16 by conventional means such as collars 21 and 22 or alternatively a bonding method such as adhesives (not shown) may be used. Support means 17–20, rods 15 and 16, collar 21 and 22, and base 1 are made from non-conducting, non-ferromagnetic material such as plastic or graphite. Magnet 13 is shown in the diagrams as an electromagnet having coils 23 around a core 24 of transformer steel or the like. Alternatively, magnet 13 may be in the form of a permanent magnet. Rods 15 and 16 and magnet 13 are in a fixed position and do not rotate.

The coil 12 is mounted on supports 18 and 20 by conventional means (not shown). While responsive means 12 is shown as a single coil, it may consist of several coils either on the same or opposite hemispheres. The coil forming responsive means 12 consists of a plurality of turns of insulated wire and includes a set of leads 26 electrically connecting the responsive means 12 to a switch 25. Leads 27 for attachment to a load (not shown) are connected to leads 26 through switch 25.

A shielding means 30 is rotatedly mounted on bearing 31 and 32 of a non-conducting, non-ferromagnetic material which are rotatively positioned around rod 15 and 16, respectively. The shielding means 30 consists of a hemisphere of superconductive material 35. It may be paired with a hemisphere 36 of a magnetically inert material such as Teflon to form a complete sphere for easier rotation or may consist solely of the hemisphere of superconductive material. The field of magnet 13 is totally contained within shielding means 30, either by the air gap between the magnet 13 and the shielding means 30 or by a ferromagnetic flux guide 45. The flux guide 45 of ferro-magnetic material, such as transformer steel, may be positioned immediately inside the shielding means 30 but not in contact with it. The flux guide 45 completely encloses the magnet 13.

The shield is so mounted that it is freely rotated on bearings 31 and 32 around rods 15 and 16 so that the hemisphere of superconductive material can be periodically placed between the magnet 13, its field and the responsive means 12, thereby shielding the responsive means 12. An electric motor 40 is attached to bearing 32 through gears 41 and 42. The electric motor, when activated, rotates the shielding means around magnet 13, alternately coming between and outside of the responsive means 12. While an electric motor 40 is shown, other means can be used to rotate the shielding means.

In starting the apparatus, the static field converter 10 is inserted in the refrigeration tank 14. The temperature is then reduced to below the transition temperature of the superconductive material 35. Rotation of the shielding means 30 is initiated by motor 40. When the switch 25 is in the open position, such that responsive means 12 does not form a complete circuit, there is nothing to resist the rotation of the shielding means 30 other than a normal friction encountered at bearings 31 and 32 and, accordingly, shielding means 30 freely rotates around rods 15 and 16 as it is driven by motor 40.

As seen in FIG. 3, at the beginning of a cycle, the superconducting hemisphere is totally outside the coils forming responsive means 12 and switch 25 is open circuited. Since switch 25 is open circuited, the hemisphere 35 freely rotates up into coil 12 when driven by motor 40. Accordingly, it can freely rotate to the position diagrammatically shown in FIG. 4 where the superconductive shielding material is positioned totally within the coil from the responsive means 12. At this point the responsive means 12 is completely shielded from the magnetic field and magnetic dipole 13, as diagrammatically shown in FIG. 4. At this point, switch means 25 is automatically closed and puts a load across responsive means 12. As the shielding means 30 continues rotation, the magnetic field generated by magnet 13 is exposed to the responsive means 12. This produces a current in the responsive means 12 and a corresponding magnetic field. This acts to further drive the superconductive portion of the shielding means 35 around rods 15 and 16 driving it to the position shown in FIG. 5 which corresponds to the initiating position of FIG. 3. Once it is in the position shown in FIG. 5, switch means 25 automatically opens the circuit once again so that the flux does not generate a magnetic field in coil 12 that would repel shielding means 30.

While the invention has been disclosed with the superconductive material being in the form of a hemisphere, it may equally be any other shape having a cavity in which the magnet 13 can be at least partially mounted.

While the invention has been described as having a preferred design, it is understood that it is capable of further modification, uses and/or adaptations of the invention following in general the principal of the invention and including such departures from the present disclosure as come within known or customary practice in the art to which the invention pertains, as may be applied to the central figures hereinabove set forth and fall within the scope of the invention of the limits of the appended claims.

I claim:

1. A static field converter comprising:
   support means;
   magnetic means for establishing a magnetic field mounted on said support means;
   responsive means which is responsive to the magnetic field established by said magnetic means mounted on the support means;
   superconductive shielding means mounted on the support means, said shielding means being movably mounted on said support means such that it can be moved around said magnetic means and said responsive means to alternately shield and unshield the responsive means from the magnetic field of the magnetic means;
   switching means connected to said responsive means which can be opened and closed as the shielding means moves around the magnetic field produced by the magnetic means; and
   the magnetic means is positioned at least partially within the responsive means.

2. A field converter according to claim 1, where the shielding means consists of a hemisphere of superconductive material which is rotatably mounted on the support means between the magnetic means and the responsive means such that the shielding means rotates around the magnetic means, periodically shielding and unshielding the responsive means from the magnetic flux of the magnetic means.

3. A field converter according to claim 2, wherein there is a flux guide of ferro-magnetic material positioned between the magnetic means and the shielding means which completely encloses the magnetic means.

4. A field converter according to claim 2, wherein the shielding means has a non-superconductive hemisphere opposite the hemisphere of superconductive material to form a single sphere containing superconductive and non-superconductive portions in which the magnetic means is mounted.

5. A field converter according to claim 2 wherein there is a cooling means for maintaining the shielding means below the transition temperature of the superconductive material from which it is formed.

6. The static field converter of claim 2, where at least two responsive means are mounted on either end of the magnetic dipole.

7. The static field converter of claim 6, where each of the responsive means consists of a coil of electrically conductive, insulated wire wound in the form of a cylinder larger in diameter than the diameter of the superconductive hemisphere of the shielding means, positioned such that when the hemisphere of the shielding means is fully rotated into one of said responsive means, it completely surrounds the portion of the magnetic means positioned in said responsive means.

8. A field converter according to claim 1, wherein a driving means rotates the shielding means around the magnetic means.

9. A field converter according to claim 1, where the shielding means consists of a superconductive material which is rotatably mounted on the support means between the magnetic means and the responsive means and where the shielding means has a cavity in which the magnetic means is at least partially mounted such that the shielding means rotates around the magnetic means, periodically shielding and unshielding the responsive means from the magnetic flux of the magnetic means.

10. A field converter according to claim 9, wherein the shielding means has a non-superconductive element opposite the superconductive element to form a single body containing superconductive and non-superconductive portions in which the magnetic means is mounted.

11. A field converter according to claim 9, wherein there is a cooling means for maintaining the shielding means below the transition temperature of the superconductive material from which it is formed.

12. The static field converter of claim 9, where at least two responsive means are mounted on either end of the magnetic dipole.

13. The static field converter of claim 12, where each of the responsive means consists of a coil of electrically conductive, insulated wire wound in the form of a cylinder larger in diameter than the diameter of the superconductive shielding means, positioned such that when the shielding means is fully rotated into one of said responsive means, it completely surrounds the portion of the magnetic means positioned in said responsive means.

* * * * *